United States Patent
Torii et al.

(10) Patent No.: US 8,708,120 B2
(45) Date of Patent: Apr. 29, 2014

(54) MULTI-PLATE CLUTCH AND MANUFACTURING METHOD OF CLUTCH HUB

(75) Inventors: Takeshi Torii, Anjo (JP); Takuro Iwase, Anjo (JP)

(73) Assignee: Aisin AW Co., Ltd., Aichi-ken (JP)

(*) Notice: Subject to any disclaimer, the term of this patent is extended or adjusted under 35 U.S.C. 154(b) by 229 days.

(21) Appl. No.: 13/234,746

(22) Filed: Sep. 16, 2011

(65) Prior Publication Data

US 2012/0080284 A1 Apr. 5, 2012

(30) Foreign Application Priority Data

Sep. 30, 2010 (JP) ................................. 2010-222779

(51) Int. Cl.
*F16D 13/52* (2006.01)
*F16D 13/74* (2006.01)
*B23P 15/14* (2006.01)

(52) U.S. Cl.
USPC ................. 192/70.12; 192/113.34; 29/893.34

(58) Field of Classification Search
USPC ......................................... 29/893.33, 893.36
See application file for complete search history.

(56) References Cited

U.S. PATENT DOCUMENTS

| 5,806,645 A | * | 9/1998 | Bhookmohan et al. | ..... 192/70.12 |
| 6,530,255 B1 | * | 3/2003 | Usui et al. | ........................ 72/334 |
| 7,263,757 B2 | * | 9/2007 | Herman | .......................... 29/509 |
| 7,383,932 B2 | * | 6/2008 | Miyazaki et al. | .......... 192/70.12 |

FOREIGN PATENT DOCUMENTS

| JP | 2-173421 A | 7/1990 |
| JP | 5-141446 A | 6/1993 |
| JP | 5-164141 A | 6/1993 |
| JP | 05-180242 A | 7/1993 |
| JP | 7-133830 A | 5/1995 |

OTHER PUBLICATIONS

International Search Report issued in International Application No. PCT/JP2011/071456 dated Dec. 27, 2011.

* cited by examiner

*Primary Examiner* — Justin Holmes
*Assistant Examiner* — Mark Manley
(74) *Attorney, Agent, or Firm* — Sughrue Mion, PLLC

(57) ABSTRACT

A multi-plate clutch including a clutch hub having a cylindrical portion; a plurality of clutch plates splined to the outer periphery of the cylindrical portion of the clutch hub, and a plurality of spline teeth being formed on the outer periphery of the cylindrical portion of the clutch hub. A recessed portion is formed on the inner side of each spline tooth, and a weir portion is formed at one end of each recessed portion by depressing one portion of the spline tooth to the inner side on one end side of the cylindrical portion. Thus forming a depressed portion, and removing, with one portion of the depressed portion left behind, a portion of the cylindrical portion on the one end side of the one portion of the depressed portion.

4 Claims, 7 Drawing Sheets

MULTI-PLATE CLUTCH AND MANUFACTURING METHOD OF CLUTCH HUB

INCORPORATION BY REFERENCE

The disclosure of Japanese Patent Application No. 2010-222779 filed on Sep. 30, 2010, including the specification, drawings and abstract thereof, is incorporated by reference in its entirety.

BACKGROUND OF THE INVENTION

1. Field of the Invention

The present invention relates to a multi-plate clutch including a clutch hub having a cylindrical portion and a plurality of clutch plates splined to the outer periphery of the cylindrical portion of the clutch hub, and to a manufacturing method of the clutch hub configuring the multi-plate clutch together with the plurality of clutch plates.

2. Description of the Related Art

To date, as this kind of multi-plate clutch, an automatic transmission multi-plate clutch configured by incorporating stacked clutch plates, wherein a plurality of driven side clutch plates linked to a clutch hub side and a plurality of drive side clutch plates linked to a clutch retainer (clutch drum) side are alternately stacked, into a clutch retainer together with a piston, has been known (for example, refer to JP-A-5-180242). With this multi-plate clutch, the outer side end face of the stacked clutch plates incorporated into the clutch retainer is retained by a protruding portion wherein an outer peripheral portion of the clutch retainer is protruded in the inward direction in a position spaced by an amount equivalent to the endplate of the stacked clutch plates. Then, such a protruding portion is formed by protruding a spline groove ridge portion on the outer peripheral surface side at the outer side edge portion of the clutch retainer or in a position slightly deeper than the outer side edge portion, or by bending the outer side edge portion of the clutch retainer to the inner side.

SUMMARY OF THE INVENTION

Meanwhile, the heretofore described kind of multi-plate clutch is generally configured in such a way that it is possible to supply hydraulic oil to the clutch plates via a communication hole formed in the outer periphery of the clutch hub in order to lubricate and cool the clutch plates. Herein, in order to supply a sufficient amount of hydraulic oil from the communication hole formed in the outer periphery of the clutch hub, it is preferable to provide a weir portion at the open end of the clutch hub so as to accumulate hydraulic oil in a recessed portion on the rear side of the spline groove ridge portion, and suppress an outflow of hydraulic oil from the open end of the clutch hub. When forming this kind of weir portion at the open end of the clutch hub, it is conceivable that the spline groove ridge portion is protruded inward like the heretofore described protruding portion formed on the clutch retainer of the heretofore known multi-plate clutch. However, as a gap is formed on either side, or the like, of the weir portion (protruding portion) even though the weir portion is formed on the clutch hub by such a technique, it is not possible to sufficiently suppress the outflow of hydraulic oil from the open end of the clutch hub, and moreover, there is a possibility of having to increase the entire length (axial length) of the clutch hub due to an occurrence of a nonuniformity of spline tooth surfaces. Also, it is also possible to form the weir portion at the open end of the clutch hub by bending the outer side edge portion of the clutch hub to the inner side, but in this case too, the entire length (axial length) of the clutch hub increases by an amount by which the outer side edge portion is bent to the inner side. Furthermore, by mounting a snap ring at the end portion of the clutch hub, a weir portion can be configured by the snap ring, but in this case, the entire length (axial length) of the clutch hub increases, and an increase in the number of parts, that is, in cost is brought about. Furthermore, by forming the clutch hub with a cutting process, it is possible to form a weir portion enabling an effective suppression of the outflow of hydraulic oil from the open end of the clutch hub, but a clutch hub manufacturing cost increases significantly.

Therefore the invention has a main object of providing a multi-plate clutch with which it is possible to effectively lubricate and cool clutch plates while suppressing a nonuniformity of the surfaces of spline teeth, a cost increase, and an increase in size of a clutch hub.

A multi-plate clutch, and a clutch hub manufacturing method, according to the invention adopt the following mechanisms in order to achieve the heretofore described main object.

The multi-plate clutch according to the invention is a multi-plate clutch including a clutch hub having a cylindrical portion; and a plurality of clutch plates splined to the outer periphery of the cylindrical portion of the clutch hub, wherein as well as a plurality of spline teeth being formed on the outer periphery of the cylindrical portion of the clutch hub, a recessed portion is formed on the inner side of each spline tooth, and a weir portion is formed at one end of each recessed portion by depressing one portion of the spline tooth to the inner side on one end side of the cylindrical portion, thus forming a depressed portion, and removing, with one portion of the depressed portion left behind, a portion of the cylindrical portion on the one end side of the one portion of the depressed portion.

The clutch hub configuring this multi-plate clutch, having the cylindrical portion wherein the plurality of spline teeth are formed on the outer periphery, and the recessed portion is formed on the inner side of each spline tooth, is such that the weir portion is formed at one end of each recessed portion by depressing one portion of the spline tooth to the inner side on one end side of the cylindrical portion, thus forming the depressed portion, and removing, with one portion of the depressed portion left behind, a portion of the cylindrical portion on the one end side of the one portion of the depressed portion. In this way, by the weir portion being formed by depressing the one portion of the spline tooth, and removing the one end side portion of the cylindrical portion with the one portion of the depressed portion left behind, it is possible to obtain weir portions having a uniform height as a whole while effectively suppressing a nonuniformity of the surfaces of the spline teeth around the weir portions, and suppressing an increase in the entire length (axial length) of the clutch hub. Then, as this kind of weir portion can be obtained by a comparatively simple press process (half-blanking process) and cutting process, it is possible to suppress an increase in manufacturing cost of the clutch hub. Consequently, by using this clutch hub, it is possible to obtain a multi-plate clutch with which it is possible to effectively lubricate and cool the clutch plates while suppressing a nonuniformity of the surfaces of the spline teeth, a cost increase, and an increase in size of the clutch hub.

Also, communication holes providing communication between the outer side of the cylindrical portion and the recessed portions may be formed in the cylindrical portion of the clutch hub. Because of this, it is possible to effectively lubricate and cool the clutch plates by supplying a sufficient amount of hydraulic fluid from the communication holes to the clutch plate sides while suppressing an outflow of hydraulic fluid from one end of the recessed portion of the clutch hub with the weir portions.

The clutch hub manufacturing method according to the invention is a manufacturing method of a clutch hub configuring a multi-plate clutch together with a plurality of clutch plates splined to the outer periphery, including:

(a) a step of forming a plurality of spline teeth on the outer periphery of a member having a cylindrical portion, and forming a recessed portion on the inner side of each spline tooth;

(b) a step of forming a depressed portion by depressing one portion of the spline tooth to the inner side on one end side of the cylindrical portion; and (c) a step of forming a weir portion at one end of the recessed portion by removing, with one portion of the depressed portion left behind, a portion of the cylindrical portion on the one end side of the one portion of the depressed portion.

According to this method, it is possible to form, on the clutch hub, weir portions having a uniform height as a whole, although a final height (the depth of the depressed portions) becomes slightly smaller, while effectively suppressing a nonuniformity of the surfaces of the spline teeth around the weir portions, and suppressing an increase in the entire length (axial length) of the clutch hub. Also, as it is sufficient to use a comparatively simple press process in the step (b), and to use a comparatively simple cutting process in the step (c), it is possible to suppress an increase in clutch hub manufacturing cost according to this method. Consequently, by using the clutch hub manufactured by this method, it is possible to obtain a multi-plate clutch with which it is possible to effectively lubricate and cool the clutch plates while suppressing a nonuniformity of the surfaces of the spline teeth, a cost increase, and an increase in size of the clutch hub.

Also, the step (b) maybe such that the depressed portion is formed by depressing one portion of the spline tooth to the inner side with a half-blanking process. Because of this, it is possible to form, in the cylindrical portion, depressed portions having a uniform depth (height) as a whole while suppressing a nonuniformity of the surfaces of the spline teeth.

Furthermore, the step (a) may be such that the spline teeth and recessed portions are formed on the cylindrical portion by a press process. Because of this, it is possible to easily form the plurality of spline teeth and recessed portions on the outer periphery of the member having the cylindrical portion.

DETAILED DESCRIPTION OF THE EMBODIMENTS

Next, a mode for carrying out the invention will be described using a working example.

Figure 1:
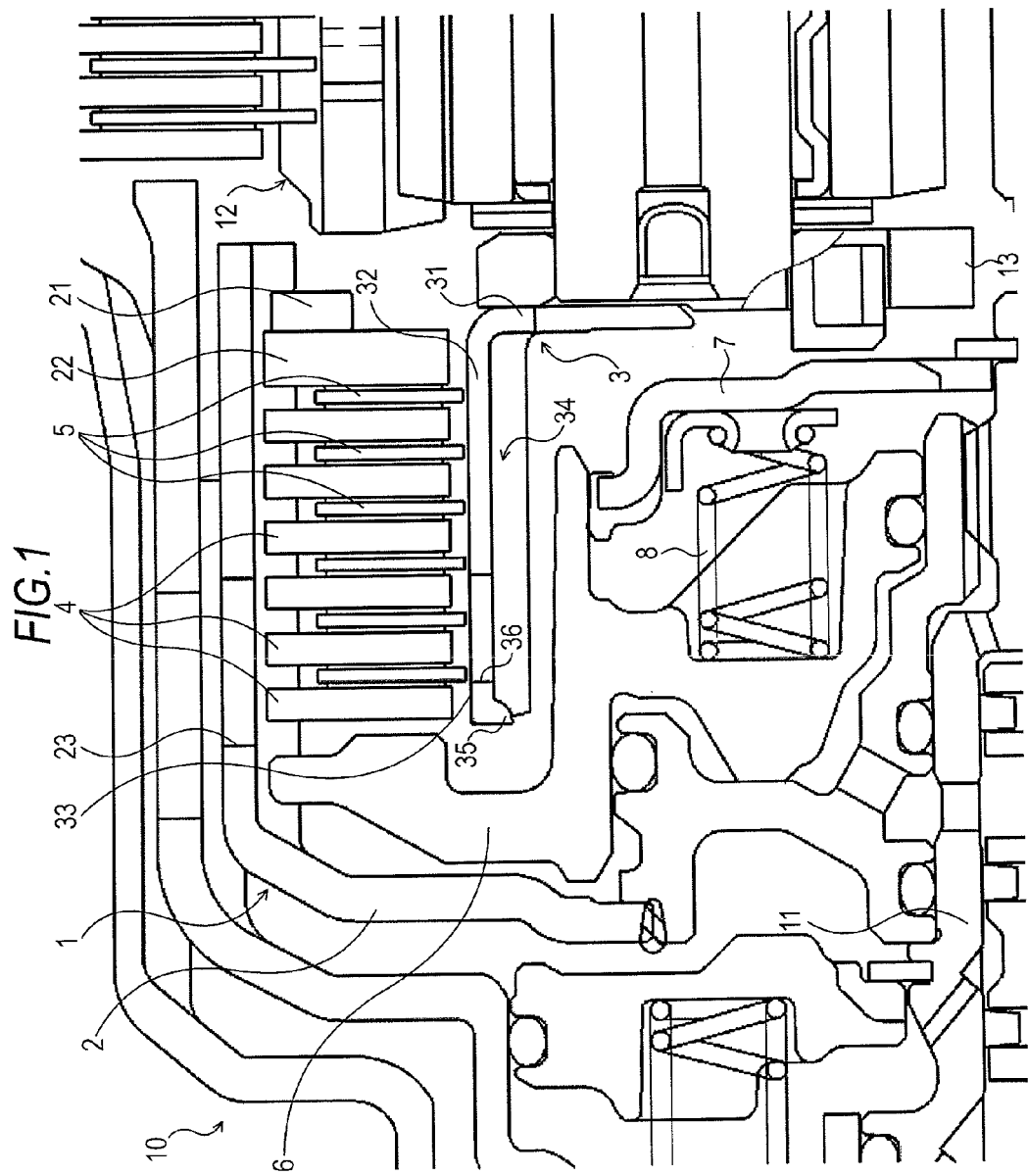
FIG. 1 is an outline configuration diagram illustrating a transmission device 10 including a multi-plate clutch 1 according to a working example of the invention.

FIG. 1 is an outline configuration diagram showing a transmission device including a multi-plate clutch 1 according to the working example of the invention. A transmission 10 shown in the drawing, being a multi-speed automatic transmission mounted in a vehicle, includes an input shaft 11 linked to a crankshaft of an engine via a torque converter, a speed change mechanism including a plurality of planet gears and a plurality of brakes and clutches, an unshown output shaft linked to a drive wheel of the vehicle via a differential gear, and the like. The multi-plate clutch 1 of the working example, being configured as a hydraulic clutch, can link the input shaft 11 of the transmission 10 and a planetary carrier 13 of the planet gear 12 included in the speed change mechanism, and release the linkage of the two.

As shown in FIG. 1, the multi-plate clutch 1 includes a clutch drum 2 fixed to the input shaft 11, a clutch hub 3 fixed to the planetary carrier 13 of the planet gear 12, a plurality of circular clutch plates (driven plates) 4 slidably splined to the inner periphery of the clutch drum 2, a plurality of circular clutch plates (drive plates) 5 slidably splined to the outer periphery of the clutch hub 3, a clutch piston 6 which, being disposed in the clutch drum 2 so as to be slidable in the axial direction, is movable toward the clutch plates 4 and 5, a cancel plate 7 which, as well as being disposed on the output shaft side of the clutch piston 6, defines together with the clutch piston 6 a cancel oil chamber for cancelling a centrifugal hydraulic pressure generated in the clutch drum 2, and a return spring 8 disposed between the clutch piston 6 and cancel plate 7. The multi-plate clutch 1 configured in this way links the clutch drum 2 and clutch hub 3 by moving the clutch piston 6 toward the plurality of clutch plates 4 and 5 using the pressure of hydraulic oil supplied from a hydraulic control unit connected to an oil pump (neither of which is shown), and clamping the plurality of clutch plates 4 and 5 between the clutch piston 6 and a retaining plate 22 fixed to the clutch drum 2 via a snap spring 21. By so doing, the clutch drum 2 and clutch hub 3 become rotatable integrally, enabling power from the engine to be transmitted from the input shaft 11 to the planetary carrier 13 of the planet gear 12 via the clutch drum 2 and clutch hub 3.

Figure 2:
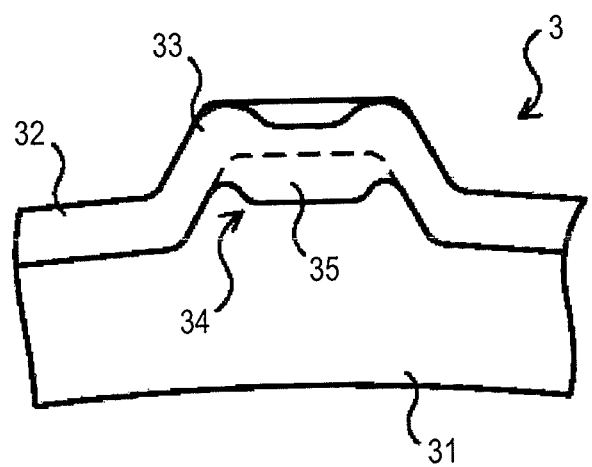
FIG. 2 is a main portion enlarged view showing a main portion of a clutch hub 3 configuring the multi-plate clutch 1.

The clutch hub 3 configuring the heretofore described multi-plate clutch 1, being configured as a bottomed cylindrical body, as can be seen from FIG. 1, has a base portion 31 which, as well as having an opening portion in the center, is fixed to the planetary carrier 13 of the planet gear 12, and a cylindrical portion 32 which is extended in the axial direction from the base portion 31, and an end portion of which on a side opposite to that of the base portion 31 is opened. As shown in FIGS. 1 and 2, a plurality of spline teeth 33 for slidably supporting the heretofore described clutch plates 5 are formed on the outer periphery of the cylindrical portion 32 in such a way that each of them extends in the axial direction of the clutch hub 3, and a recessed portion 34 extending in the axial direction of the clutch hub 3 is formed on the inner side (rear side) of each spline tooth 33. Also, a weir portion 35 is formed at the leading end (the left end in FIG. 1) of each recessed portion 34. As shown in FIG. 2, each weir portion 35 is extended from the inner surface of the open end of the cylindrical portion 32 toward the radial inner side in such away as to close the leading end of the corresponding recessed portion 34 to a certain extent. Furthermore, a communication hole 36 is formed in the cylindrical portion 32 in such a way as to be positioned in the vicinity of the weir portion 35 and provide communication between the recessed portion 34 on the inner side of each spline tooth 33 and the outer side of the cylindrical portion 32.

With the multi-plate clutch 1 including the clutch hub 3 configured in this way, when the oil pump operates along with a moving of the vehicle (an operation of the engine), hydraulic oil is also supplied to the inside of the clutch hub 3 via oil passages or the like formed in the input shaft 11. Then, the hydraulic oil supplied into the clutch hub 3, after accumulating in the plurality of recessed portions 34 formed on the inner periphery of the clutch hub 3, flows into the periphery of the clutch plates 4 and 5 via the communication holes 36. At this time, as the heretofore described weir portion 35 is formed at the leading end of each recessed portion 34 of the clutch hub 3, an outflow of hydraulic oil from the open end side of the clutch hub 3, that is, the leading end side of each recessed portion 34, is suppressed. Consequently, with the multi-plate clutch 1 of the working example, it is possible to effectively lubricate and cool the plurality of clutch plates 4 and 5 by supplying a sufficient amount of hydraulic oil from each communication hole 36 to the clutch plate 4 and 5 sides. The hydraulic oil, having lubricated and cooled the clutch plates 4 and 5, flows into an unshown oil pan via oil holes 23 or the like formed in the outer periphery of the clutch drum 2.

Next, a description will be given, while referring to FIGS. 3 to 7, and the like, of manufacturing steps of the clutch hub 3 configuring the heretofore described multi-plate clutch 1.

Figure 3:
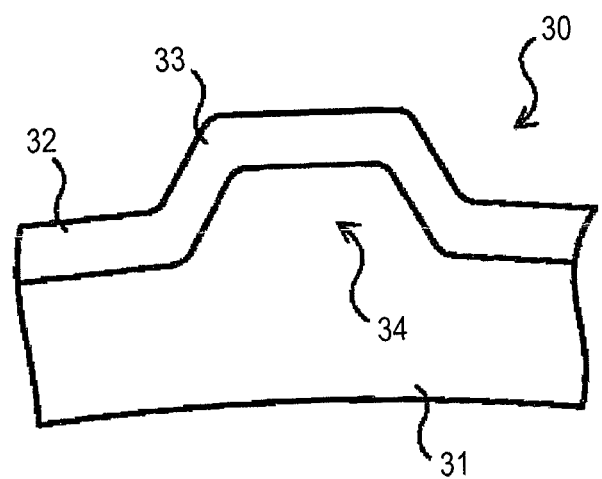
FIG. 3 is an illustration showing a manufacturing procedure of the clutch hub 3 configuring the multi-plate clutch 1.
Figure 4:
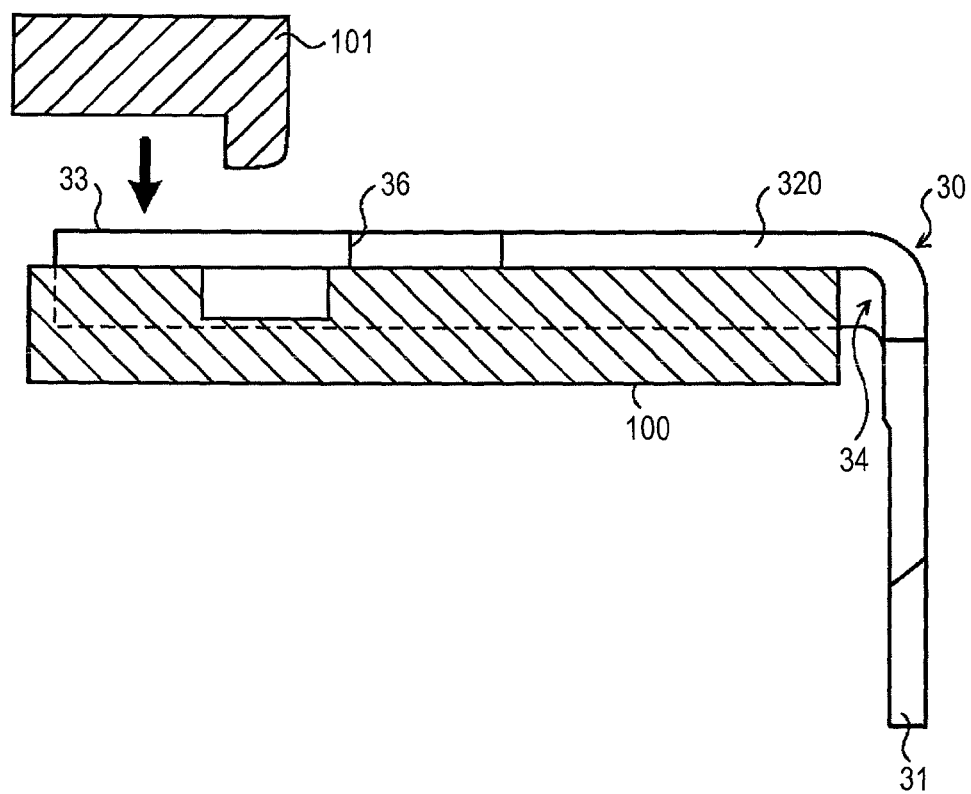
FIG. 4 is an illustration showing the manufacturing procedure of the clutch hub 3 configuring the multi-plate clutch 1.

When manufacturing the clutch hub 3, firstly, a punching process and drawing process are performed on a metal plate using an unshown press molding apparatus, thereby obtaining a metallic bottomed cylindrical body having a base portion with an opening in the center and a cylinder portion extended in the axial direction from the base portion. Next, a press process using an unshown press molding apparatus for spline molding is performed on the bottomed cylindrical body obtained in this way, thereby forming the plurality of spline teeth 33 on the outer periphery of the cylinder portion of the bottomed cylindrical body, and forming the recessed portion 34 on the inner side of each spline tooth 33 simultaneously with the spline teeth 33. By so doing, as shown in FIGS. 3 and 4, a semifinished product 30 of the clutch hub 3 having the base portion 31 and a cylindrical portion 320 which, as well as having the plurality of spline teeth 33 on the outer periphery, has the recessed portion 34 on the inner side of each spline tooth 33, is obtained. In this way, by using the press process, it is possible to easily form the plurality of spline teeth 33 and recessed portions 34 on the outer periphery of the bottomed cylindrical body having the cylinder portion. Herein, the cylindrical portion 320 of the semifinished product 30 is formed in such a way that the axial length thereof is greater than the axial length of the cylindrical portion 32 of the finally obtained clutch hub 3. Then, the communication holes 36 are formed in the cylindrical portion 320 in such a way as to provide communication between the recessed portion 34 on the inner side of each spline tooth 33 and the outer side of the cylindrical portion 32.

Figure 5:
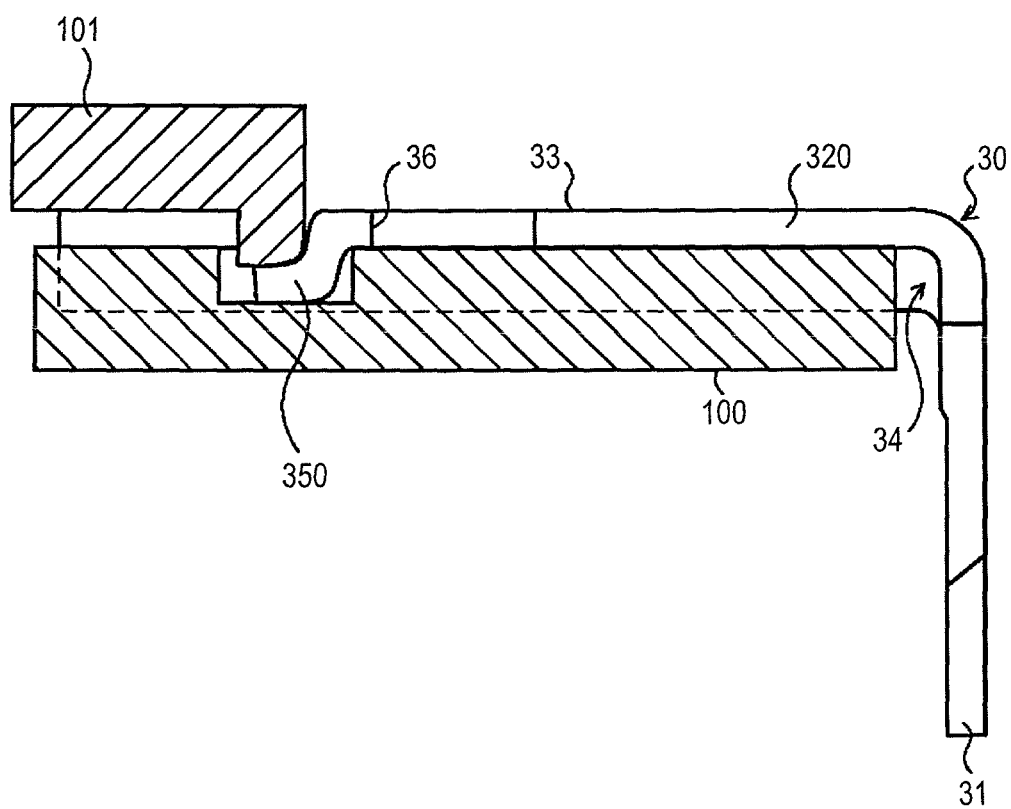
FIG. 5 is an illustration showing the manufacturing procedure of the clutch hub 3 configuring the multi-plate clutch 1.
Figure 6:
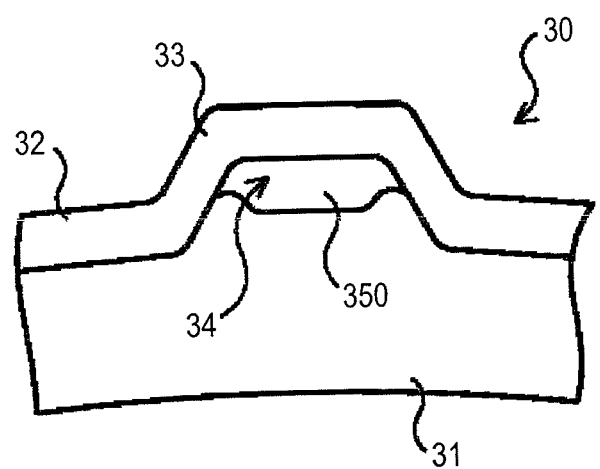
FIG. 6 is an illustration showing the manufacturing procedure of the clutch hub 3 configuring the multi-plate clutch 1.

Continuing, a half-blanking process is performed on the semifinished product 30, thereby depressing one portion of each spline tooth 33 to the inner side on the open end side of the cylindrical portion 320. In the working example, as shown in FIGS. 4 and 5, as well as a half-blanking die 100 being pressed against a plurality (for example, around two to five) of spline teeth 33 from inside the cylindrical portion 320, a half-blanking punch 101 is pressed against the relevant plurality of spline teeth 33 from outside the cylindrical portion 320, thereby depressing one portion of each targeted spline tooth 33 to the inner side. By so doing, as shown in FIGS. 5 and 6, a depressed portion 350 projecting into the recessed portion 34 is formed in the spline tooth 33 in such a way as to be positioned on the open end side of the cylindrical portion 320. This kind of half-blanking process is performed on each plurality of spline teeth 33, and finally, the depressed portion 350 is formed in each spline tooth 33. In the example of FIG. 5, one portion of the depressed portion 350 on the open end side (the left side in the drawing) is separated from the spline tooth 33 using the kind of half-blanking die 100 shown in the drawing, but this is not limiting. That is, it is sufficient that the depressed portion 350 has a required depth, and the depressed portion 350 may be formed using another half-blanking die into a condition in which it is completely connected to the spline tooth 33.

Figure 7:
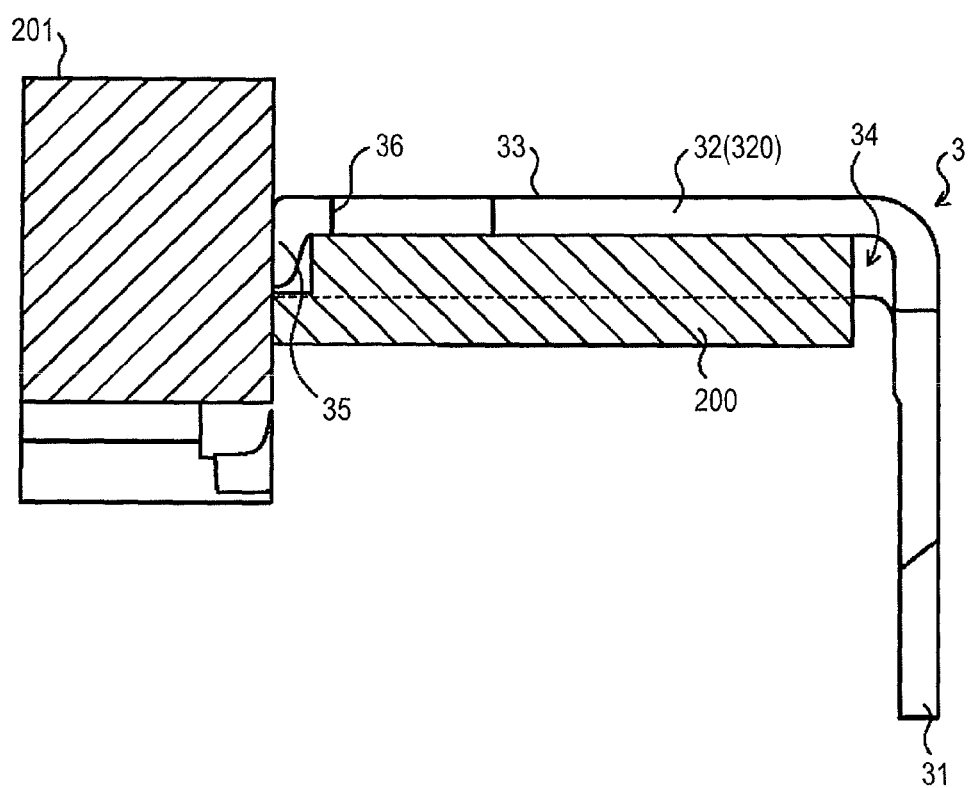
FIG. 7 is an illustration showing the manufacturing procedure of the clutch hub 3 configuring the multi-plate clutch 1.

Then, a cutting process is performed on the semifinished product 30 in which the depressed portion 350 is formed in each spline tooth 33, and with one portion of each depressed portion 350 left behind, a portion of the cylindrical portion 320 on the open end side of the one portion of the depressed portion 350 is removed. In the working example, as shown in FIG. 7, in a condition in which a die 200 is pressed against a plurality (for example, around two to five) of spline teeth 33 from inside the cylindrical portion 320, open end side portions of the cylindrical portion 320 corresponding to the plurality of spline teeth 33 are cut off by a punch 201. By so doing, as shown in FIGS. 2 and 7, the weir portion 35 extending toward the radial inner side is formed at one end of the recessed portion 34 on the inner side (rear side) of the spline tooth 33 in such a way as to close the open end of the relevant recessed portion 34 to a certain extent. A cutting position of the cylindrical portion 320 in the axial direction is set in such a way that the height of the depressed portions 350 left behind without being removed is a height required of the weir portions 35. This kind of cutting process is performed on each plurality of spline teeth 33, and finally, the weir portion 35 is formed at one end of each recessed portion 34, thus completing the manufacturing of the clutch hub 3. A surface finishing process may be performed on an end face (open end side end face) of the cylindrical portion 32 of the clutch hub 3 as necessary.

As heretofore described, the clutch hub 3 configuring the multi-plate clutch 1 of the working example, having the cylindrical portion 32 wherein the plurality of spline teeth 33 are formed on the outer periphery, and the recessed portion 34 is formed on the inner side of each spline tooth 33, is such that the weir portion 35 is formed by depressing one portion of the spline tooth 33 to the inner side on one end side (the open end side) of the cylindrical portion 32, that is, the cylindrical portion 320 of the semifinished product 30, thus forming the depressed portion 350, and removing, with one portion of the depressed portion 350 left behind, a portion of the cylindrical portion 320 on the one end side of the one portion of the depressed portion 350. In this way, by the weir portion 35 being formed by depressing one portion of the spline tooth 33 to the inner side, and removing the one end side (open end side) portion of the cylindrical portion 320 (32) with one portion of the depressed portion 350 left behind, it is possible to obtain weir portions 35 having a uniform height as a whole, although a final height (the depth of the depressed portions 350) becomes slightly smaller, while effectively suppressing a nonuniformity of the surfaces of the spline teeth 33 around the weir portions 35, and suppressing an increase in the entire length (axial length) of the clutch hub 3 (refer to FIG. 2).

By forming the heretofore described kind of weir portion 35 at one end of each recessed portion 34 on the inner periphery side of the clutch hub 3, it is possible to effectively lubricate and cool the clutch plates 4 and 5 by supplying a sufficient amount of hydraulic oil from the communication holes 36 to the clutch plate 4 and 5 sides while suppressing an outflow of hydraulic oil from one end of each recessed portion 34 of the clutch hub 3 with the weir portions 35. Then, as the heretofore described weir portions 35 can be obtained by a comparatively simple press process, that is, half-blanking process, and cutting process, it is possible to suppress an increase in manufacturing cost of the clutch hub 3 accompanying the formation of the weir portions 35. Consequently, by using the clutch hub 3 having the heretofore described weir portions 35, it is possible to obtain the multi-plate clutch 1 with which it is possible to effectively lubricate and cool the clutch plates 4 and 5 while suppressing a nonuniformity of the surfaces of the spline teeth 33, a cost increase, and an increase in size of the clutch hub 3.

Also, by the depressed portion 350 being formed by depressing one portion of the spline tooth 33 to the inner side with the half-blanking process, as in the heretofore described working example, it is possible to form the depressed portions 350 having the uniform depth (height) as a whole in the cylindrical portion 32 while suppressing a nonuniformity of the surfaces of the spline teeth 33 around the weir portions 35. Then, by reducing the nonuniformity of the surfaces of the spline teeth 33 around the weir portions 35, it is possible in the heretofore described working example to expand a range, in which the clutch plate 4 positioned closest to the clutch piston 6 side slides on the clutch hub 3, as far as possible to the open end side of the cylindrical portion 32.

Herein, a description will be given of a correspondence relationship between the main components of the working example and the main components of the invention described in the section of "Summary of the Invention". That is, in the heretofore described working example, the multi-plate clutch 1 including the clutch hub 3 having the cylindrical portion 32 and the plurality of clutch plates 4 splined to the outer periphery of the cylindrical portion 32 of the clutch hub 3 corresponds to a "multi-plate clutch", the plurality of spline teeth 33 formed on the outer periphery of the cylindrical portion 32 of the clutch hub 3 correspond to "spline teeth", the recessed portion 34 formed on the inner side of each spline tooth 33 corresponds to a "recessed portion", the weir portion 35 formed at one end of each recessed portion 34 corresponds to a "weir portion", the depressed portion 350 formed by depressing one portion of each spline tooth 33 to the inner side on one end side of the cylindrical portion 32, that is, the cylindrical portion 320 of the semifinished product 30, corresponds to a "depressed portion", and the communication holes 36 providing communication between the outer side of the cylindrical portion 32 and the recessed portions 34 correspond to "communication holes". However, as the correspondence relationship between the main components of the working example and the main components of the invention described in the section of "Summary of the Invention" is an example for specifically describing the mode for carrying out the invention, it does not limit the components of the invention described in the section of "Summary of the Invention". That is, the working example only being one specific example of the invention described in the section of "Summary of the Invention", the interpretation of the invention described in the section of "Summary of the Invention" should be made based on the description of the section.

Heretofore, an embodiment of the invention has been described using the working example but, the invention not being limited by the heretofore described working example in any way, it goes without saying that various modifications can be made without departing from the scope of the invention.

The invention is applicable in a multi-plate clutch manufacturing industry.

What is claimed is:

1. A manufacturing method of a clutch hub configuring a multi-plate clutch together with a plurality of clutch plates splined to the outer periphery, comprising:
    (a) a step of forming a plurality of spline teeth on the outer periphery of a member having a cylindrical portion, and forming a recessed portion on the inner side of each spline tooth;
    (b) a step of forming a depressed portion, which is continuously connected to the spline tooth by a bending portion bent from the spline tooth, by depressing one portion of the spline tooth to the inner side by pressurizing from the outer side in the radial direction of the cylindrical portion on one end side of the cylindrical portion; and
    (c) a step of forming a weir portion at one end of the recessed portion by cutting the bending portion therebetween, with one portion of the bending portion in the spline teeth side remaining connected to the spline tooth, by moving a punch from the outer side to the inner side in the radial direction of the cylindrical portion.

2. The clutch hub manufacturing method according to claim 1, wherein
    the step (b) is such that the depressed portion is formed by depressing one portion of the spline tooth to the inner side with a half-blanking process.

3. The clutch hub manufacturing method according to claim 1, wherein
    the step (a) is such that the spline teeth and recessed portions are formed on the cylindrical portion by a press process.

4. The clutch hub manufacturing method according to claim 2, wherein
    the step (a) is such that the spline teeth and recessed portions are formed on the cylindrical portion by a press process.

* * * * *